(12) United States Patent
Abe (10) Patent No.: US 9,429,223 B2
(45) Date of Patent: Aug. 30, 2016

(54) POWER TRANSMISSION DEVICE (71) Applicant: Sumitomo Heavy Industries, Ltd., Tokyo (JP)

(72) Inventor: Kazuhisa Abe, Okayama (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 8 days.

(21) Appl. No.: 14/457,672

(22) Filed: Aug. 12, 2014

(65) Prior Publication Data
US 2014/0345420 A1 Nov. 27, 2014

Related U.S. Application Data (63) Continuation of application No. PCT/JP2013/056253, filed on Mar. 7, 2013.

(30) Foreign Application Priority Data

Mar. 19, 2012 (JP) ................. 2012-062780
Mar. 19, 2012 (JP) ................. 2012-062781

(51) Int. Cl.
*F16H 57/04* (2010.01)
*F16H 41/30* (2006.01)
*F16D 33/18* (2006.01)
*F16H 57/02* (2012.01)

(52) U.S. Cl.
CPC ........... *F16H 57/0415* (2013.01); *F16D 33/18* (2013.01); *F16H 41/30* (2013.01); *F16H 57/0416* (2013.01); *F16D 2300/0212* (2013.01); *F16D 2300/26* (2013.01); *F16H 2057/02073* (2013.01); *Y10T 74/2189* (2015.01)

(58) Field of Classification Search
CPC ............... F16H 57/0416; F16H 57/04; F16H 57/0498; F16H 57/0415; F16H 41/30; F16H 57/025; F16H 2057/02073; F16D 2300/0212; Y10T 74/2186; Y10T 74/2189
See application file for complete search history.

(56) References Cited

U.S. PATENT DOCUMENTS 7,827,878 B2 * 11/2010 Langer ................. F16H 1/14
74/423

FOREIGN PATENT DOCUMENTS

| DE | 196 14 590 A1 | 9/1996 |
| JP | S50-36978 U | 4/1975 |
| JP | H05-322006 A | 12/1993 |
| JP | H05-322007 A | 12/1993 |
| JP | 2005-308070 A | 11/2005 |
| WO | WO-2011/071042 A1 | 6/2011 |

OTHER PUBLICATIONS

Extended European Search Report issued in European Application No. 13764013.2, dated Feb. 29, 2016.

* cited by examiner

*Primary Examiner* — Thomas Diaz
(74) *Attorney, Agent, or Firm* — Michael Best & Friedrich LLP (57) ABSTRACT

A power transmission device in which a motor and a reduction gear are connected through a fluid coupling, includes: a fan for reduction gear cooling provided at an input shaft of the reduction gear; and a protective cover configured to cover the fluid coupling, wherein the protective cover is provided with an air intake for the fan, and a guide unit that guides air drawn in from the air intake to the fan.

11 Claims, 6 Drawing Sheets

POWER TRANSMISSION DEVICE

INCORPORATION BY REFERENCE

Priority is claimed to Japanese Patent Application No. 2012-062780, filed Mar. 19, 2012, Japanese Patent Application No. 2012-062781, filed Mar. 19, 2012, and International Patent Application No. PCT/JP2013/056253, the entire content of each of which is incorporated herein by reference.

BACKGROUND

1. Technical Field

The present invention relates to a power transmission device provided with a fluid coupling.

2. Description of the Related Art

A power transmission device connecting a motor and a reduction gear is used in various uses.

In general, in this type of power transmission device, a fan for cooling is disposed on the side opposite to the load side of the motor. However, with only the fan mounted on the motor, it may be difficult to perform sufficient cooling to the reduction gear which is at a position away from the fan.

In the related art, a configuration is disclosed in which, in a power transmission device which is used particularly in an environment having high heat load, a fan is mounted on an input shaft of a reduction gear in order to efficiently cool the reduction gear. According to this configuration, it is possible to cool a casing of the reduction gear well by the fan mounted on the input shaft.

SUMMARY

According to an embodiment of the present invention, there is provided a power transmission device in which a motor and a reduction gear are connected through a fluid coupling, including: a fan for reduction gear cooling provided at an input shaft of the reduction gear; and a protective cover configured to cover the fluid coupling, wherein the protective cover is provided with an air intake for the fan, and a guide unit that guides air drawn in from the air intake to the fan.

According to another embodiment of the present invention, there is provided a power transmission device in which a motor and a reduction gear are connected through a fluid coupling, including: a protective cover configured to cover the fluid coupling, wherein an air intake is disposed at a position close to the reduction gear of the protective cover, an air outlet is disposed at a position away from the reduction gear of the protective cover, and air drawn in from the air intake by rotation of the fluid coupling is discharged from the air outlet.

According to still another embodiment of the present invention, there is provided a power transmission device in which a motor and a reduction gear are connected through a fluid coupling, including: a protective cover configured to cover the fluid coupling, wherein an air outlet is disposed at a position close to the reduction gear of the protective cover, an air intake is disposed at a position away from the reduction gear of the protective cover, and air drawn in from the air intake by rotation of the fluid coupling is discharged from the air outlet.

DETAILED DESCRIPTION

In the power transmission device of the related art, in a case of connecting the motor and the reduction gear through a fluid coupling, a problem in that the fan mounted on the input shaft of the reduction gear sometimes does not function well is found.

It is desirable to efficiently cool a reduction gear in a power transmission device connecting a motor and the reduction gear through a fluid coupling.

According to the verification of the inventor, in a case of connecting a motor and a reduction gear through a fluid coupling, a cause that a fan mounted on an input shaft of the reduction gear does not function well is estimated to be because the fluid coupling rotates, whereby the fluid coupling itself generates its own air flow, and this air flow and an air flow of the fan mounted on the reduction gear interfere with each other in the protective cover.

The present invention has been made based on this knowledge.

Hereinafter, an example of an embodiment of the present invention will be described in detail based on the drawings.

Figure 1:
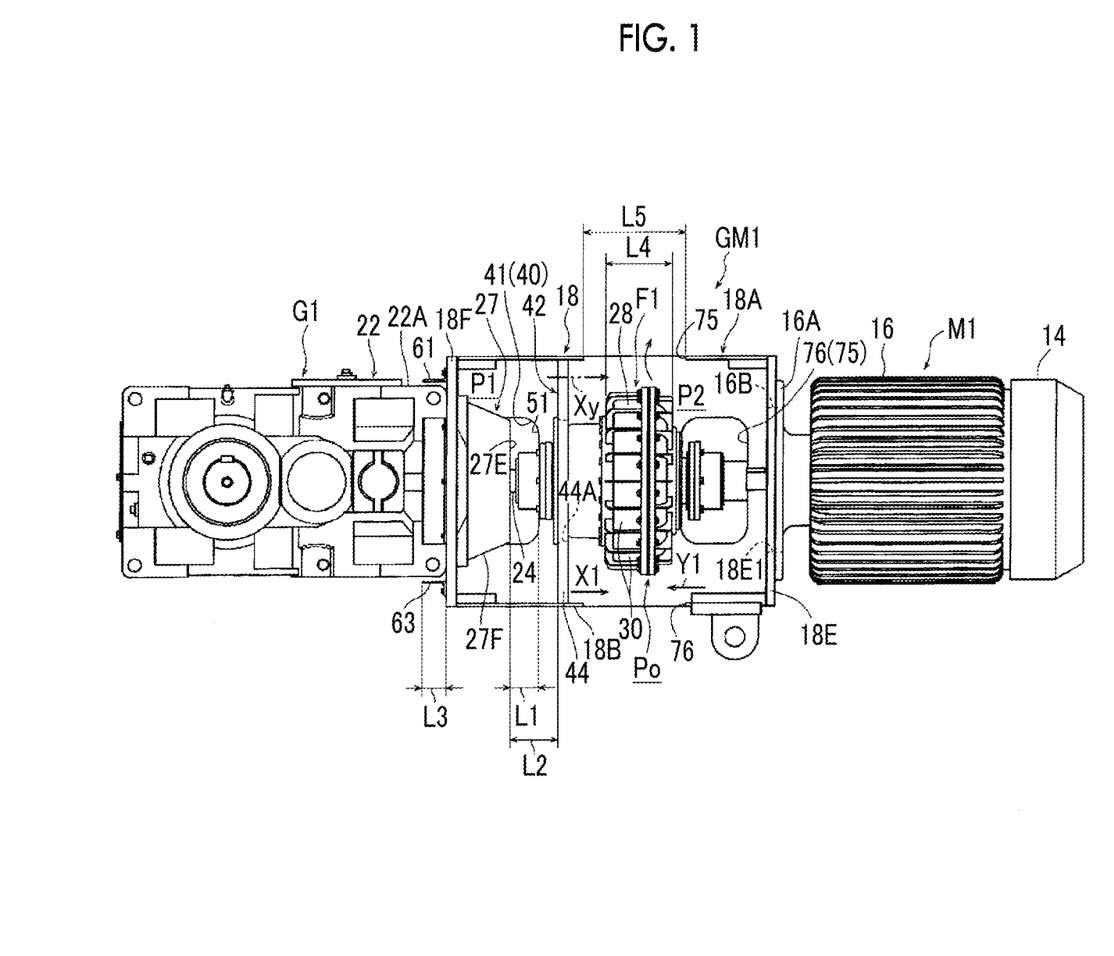
FIG. 1 is a front view showing the entirety of a power transmission device according to an example of an embodiment of the present invention.

FIG. 1 is a front view showing the entirety of a power transmission device according to an example of an embodiment of the present invention. In FIG. 1, the side surface (the front in FIG. 1) of a protective cover is removed, and thus a state in the protective cover is made so as to be visible.

In a power transmission device GM1 according to this embodiment, a motor M1 and a reduction gear G1 are connected through a fluid coupling F1.

The motor M1 is a three-phase induction motor. A motor fan (not shown) covered with a fan hood 14 is provided on the side opposite to the load side of the motor M1. A spigot joint portion 16B which is joined to a protective cover 18 is formed at a case cover 16A on the load side of a casing 16 of the motor M1.

As the reduction gear G1, a three-stage type orthogonal reduction gear is adopted. However, in certain embodiments of the present invention, the number of stages of the reduction gear is not particularly limited, and, for example, a two-stage type or four-stage type reduction gear is also acceptable. Further, a reduction mechanism is also not particularly limited, and, for example, a parallel shaft reduction mechanism or a planetary gear reduction mechanism is also acceptable.

Figure 2:
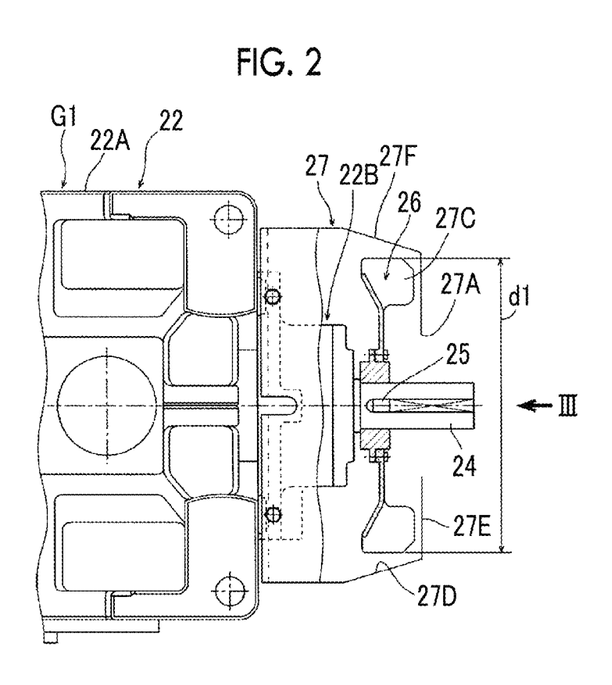
FIG. 2 is a partially enlarged cross-sectional view showing the vicinity of a fan of a reduction gear of the power transmission device.
Figure 3:
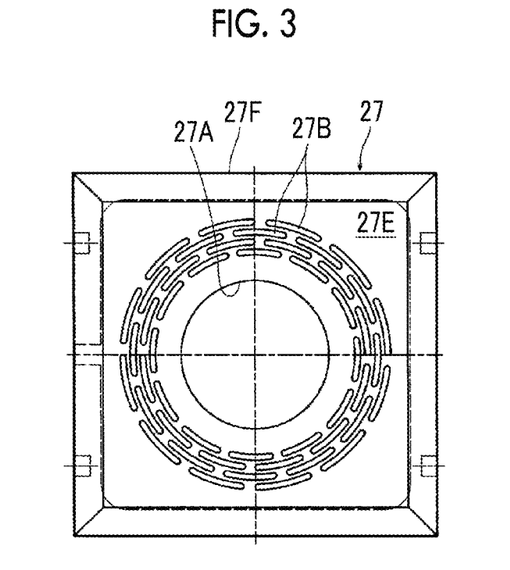
FIG. 3 is a side view when viewed from a direction of an arrow III of FIG. 2.

Referring to FIGS. 2 and 3 together, a casing 22 of the reduction gear G1 is configured to mainly include a casing main body 22A and a bearing housing 22B formed to protrude from the casing main body 22A to the motor M1 side. A bearing (not shown) which rotatably supports an input shaft 24 of the reduction gear G1 is accommodated in the bearing housing 22B.

A fan 26 is assembled to the input shaft 24 of the reduction gear G1 of the power transmission device GM1 through a key 25. A fan hood 27 is attached to the fan 26. The fan hood 27 has a through-hole 27A at the center in a radial direction on the side surface on the motor side in an axial direction of the input shaft 24, and a large number of air flow holes 27B are formed on concentric circles around the through-hole 27A.

The fan 26 moves air supplied into the fan hood 27 through the through-hole 27A and the air flow holes 27B radially outward by the rotation of a blade 27C and further moves the air to the reduction gear G1 side along an inner peripheral surface 27D of the fan hood 27, whereby it is possible to always discharge cooling air to the reduction gear G1 side without depending on a rotation direction of the input shaft 24.

As described above, the motor M1 and the reduction gear G1 are connected through the fluid coupling F1. However, foreign matter is sometimes bitten by the fluid coupling F1 according to the use of the power transmission device GM1 of this embodiment. There is a concern that the coupling rigidly connecting the motor side and the reduction gear side may stop the entire device when such foreign matter is bitten, and there is a worry of occurrence of overload. The fluid coupling F1 is a coupling in which there is an advantage such as relaxing a shock at the time of start-up or the time of sudden stop, in addition to avoidance of the overload when such foreign matter is bitten.

The fluid coupling F1 itself is known, and the fluid coupling F1 has a configuration in which a pump impeller (an input-side vane wheel) and a runner (an output-side vane wheel), none of which is shown, face each other in a casing 28 filled with oil and the rotation of the pump impeller on the input side makes the oil flow, thereby rotating the runner on the output side. In addition, the fluid coupling in certain embodiments of the present invention includes the concept of a torque converter provided with a stator, in addition to a so-called narrowly-defined fluid coupling.

A large number of fins 30 are provided at an outer periphery of the casing 28 of the fluid coupling F1 in order to dissipate heat generated in the fluid coupling F1 itself. However, the fins 30 are rotated, thereby generating an air flow. More specifically, the fluid coupling F1 according to this embodiment basically generates air flows X1 and Y1 which converge together toward the fluid coupling F1 from both sides in the axial direction. Further, in the air flow X1 to the motor M1 side in the axial direction of the fluid coupling F1 of this embodiment and the air flow Y1 to the reduction gear G1 side, the air flow X1 to the motor M1 side is stronger with regard to the formation aspect of the fins 30, and therefore, an air flow Xy which moves from the reduction gear G1 side to the motor M1 side in the entirety in the protective cover 18 (if any measure is not performed) is generated. Therefore, if the fluid coupling F1 and the fan 26 for reduction gear cooling are adjacently accommodated in the protective cover 18 (without any measure), the air flow X1 (or Xy) caused by the fluid coupling F1 inhibits the function of the fan 26, and thus there is a concern that the reduction gear G1 may not be sufficiently cooled.

Therefore, in this embodiment, the fan 26 for reduction gear cooling is configured as follows so as to fulfill an original function.

Hereinafter, the configuration of the periphery of the fan 26 will be described in detail.

Figure 4:
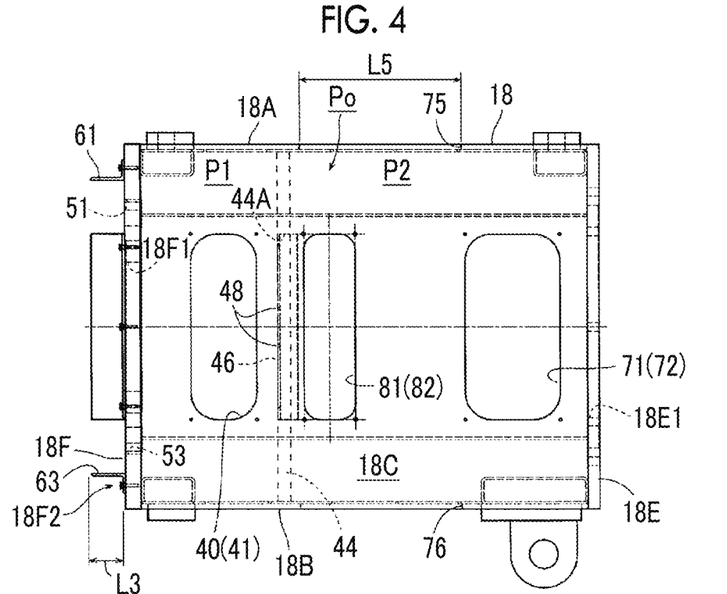
FIG. 4 is a front view showing a protective cover of the power transmission device.
Figure 5:
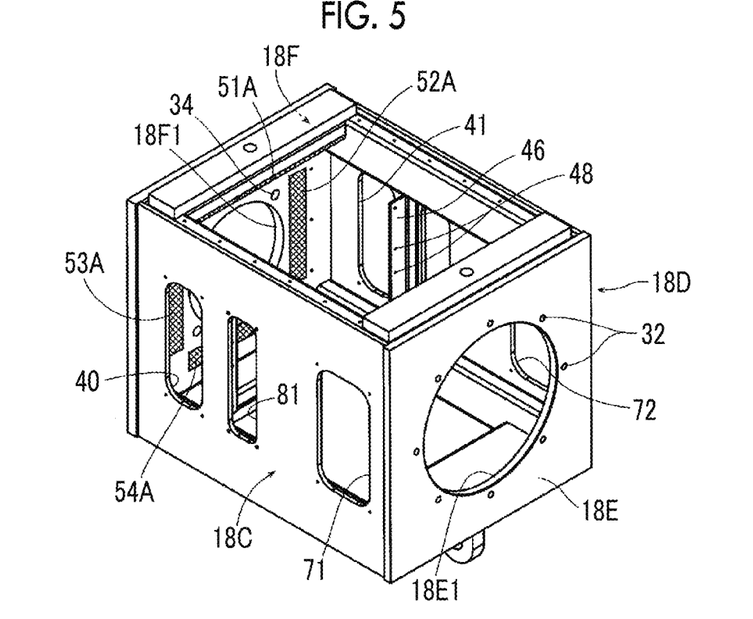
FIG. 5 is a perspective view of the protective cover.
Figure 6:
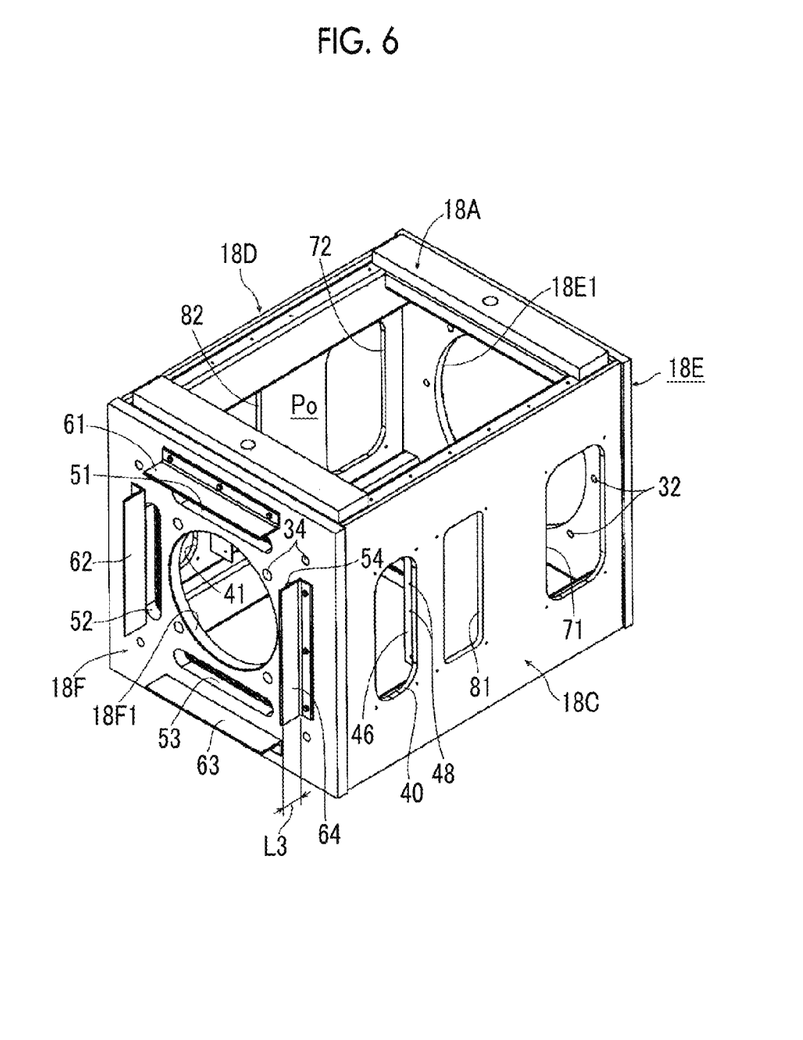
FIG. 6 is a perspective view of the protective cover when viewed from another direction.

FIG. 4 is a front view of the protective cover, and FIGS. 5 and 6 are perspective views of the protective cover. In addition, in FIGS. 5 and 6, only mounting hardware 46 of a partition plate 44 (described later) is shown and the partition plate 44 itself is not shown.

The protective cover 18 is formed into the form of a substantially rectangular parallelepiped-shaped box. For convenience, with respect to the respective surfaces of the rectangular parallelepiped, surfaces horizontally extending at an upper portion and a lower portion of the protective cover 18 will be referred to as an upper surface 18A and a lower surface 18B, surfaces provided to be vertically erect so as to connect the upper surface 18A and the lower surface 18B will be referred to as a left side surface 18C and a right side surface 18D (based on a direction when the reduction gear G1 is viewed from the motor M1 side), a surface (perpendicular to an axis and facing the motor M1) which is fixed to the casing 16 of the motor M1 will be referred to as a motor connection surface 18E, and a surface (perpendicular to the axis and facing the reduction gear G1) which is fixed to the casing 22 of the reduction gear G1 will be referred to as a reduction gear connection surface 18F. In addition, in FIGS. 5 and 6, a top plate of the upper surface 18A of the protective cover 18 is illustrated as being opened to a large extent such that the inside of the protective cover 18 is seen. In fact, as will be described later, in the upper surface 18A of the protective cover 18, an air outlet 75 having an opening smaller than an opening depicted in FIGS. 5 and 6 is formed only on a side of a coupling-side space P2.

A through-hole 18E1 which is engaged with the spigot joint portion 16B of the casing 16 of the motor M1 is formed in the motor connection surface 18E of the protective cover 18. The motor connection surface 18E and the motor M1 are connected by bolts (only bolt holes are shown) 32 after each other's axial centers are matched through the spigot joint portion 16B and the through-hole 18E1.

Further, a through-hole 18F1 which is engaged with a spigot joint portion (not shown) of the casing 22 of the reduction gear G1 is formed in the reduction gear connection surface 18F of the protective cover 18. The reduction gear connection surface 18F and the reduction gear G1 are connected by the casing main body 22A of the reduction gear G1 and bolts (only bolt holes are shown) 34 at the outer periphery of the bearing housing 22B after each other's axial centers are matched through the spigot joint portion and the through-hole 18F1.

In this way, the periphery of the fluid coupling F1 is regarded as a space Po almost closed by the protective cover 18. The fluid coupling F1 is located slightly closer to the motor than the center in the axial direction in the protective cover 18.

In addition, the bearing housing 22B faces the inside of the protective cover 18 with a portion thereof going beyond the reduction gear connection surface 18F of the protective cover 18. The fan 26 is further toward the fluid coupling F1 side than the bearing housing 22B, and therefore, if a point of view is changed, the protective cover 18 extends further toward the reduction gear G1 side (the downstream side of the fan 26) than the fan 26 and then is closed by the reduction gear connection surface 18F.

Here, air intakes 40 and 41 (for the fan 26) for taking in air to be sent to the fan 26 are formed (opened) in the protective cover 18. Specifically, the air intakes 40 and 41 are disposed and opened at the left side surface 18C and the right side surface 18D of the protective cover 18. Each of the air intakes 40 and 41 has a rectangular shape with four rounded corners and is opened in an aspect in which a side S1 on the fluid coupling F1 side in the axial direction of the rectangle is separated by a distance L1 from an axial side surface 27E of the fan hood 27 to a side opposite to the reduction gear G1 in the axial direction (the distance L1 is secured).

Further, the protective cover 18 is provided with a guide unit 42 for guiding air drawn in from the air intakes 40 and 41 to the fan 26. Specifically, the protective cover 18 has, as the guide unit 42, the partition plate 44 which partitions a fan-side space P1 which includes the fan 26 and the air intakes 40 and 41 and a coupling-side space P2 which includes the fluid coupling F1 as separate spaces.

The partition plate 44 is disposed at a position separated from the axial side surface 27E of the fan hood 27 by a distance L2. The distance L2 is secured to be greater than or equal to ⅓ of a diameter d1 of the fan 26. This is because, if the partition plate 44 approaches the fan 26 to an extent less than the distance, the positions of the air intakes 40 and 41 inevitably approach the fan 26 in the axial direction, and thus air drawn in from the air intakes 40 and 41 strikes on an outer peripheral surface 27F of the fan hood 27 in a large amount (if air drawn in from the air intakes 40 and 41 strikes on the outer peripheral surface 27F of the fan hood 27, whereby the air cannot smoothly enter into the fan hood 27, as a result, generation efficiency of cooling air by the fan 26 is lowered).

In addition, the partition plate 44 is mounted on the mounting hardware 46 by bolts (only bolt holes are shown) 48. A through-hole 44A for the passage of the input shaft 24 of the reduction gear G1 (an output shaft of the fluid coupling F1) is formed at the center in the radial direction of the partition plate 44.

The reduction gear connection surface 18F of the protective cover 18 has an enlarged portion 18F2 larger in the radial direction than the outer shape of the casing main body 22A of the casing 22 of the reduction gear G1. In this embodiment, air outlets 51 to 54 for discharging the cooling air of the fan 26 to the reduction gear G1 side are opened and disposed at the enlarged portion 18F2. Specifically, the air outlets 51 to 54 have an elongated rectangular shape and four are provided at a position corresponding to the outer periphery of the bearing housing 22B of the casing 22 of the reduction gear G1 so as to follow the sides of an imaginary square.

In addition, the portion corresponding to the outer periphery of the bearing housing 22B of the casing 22 of the reduction gear G1 has a shape (having a small radial dimension) slightly recessed in the radial direction further than the outer peripheral surface of the major portion of the casing main body 22A of the reduction gear G1. Therefore, the casing main body 22A of the reduction gear G1 does not block the air outlets 51 to 54. Further, the fan hood 27 is mounted on the reduction gear connection surface 18F of the protective cover 18 (rather than the casing main body 22A of the reduction gear G1) and covers all of the air outlets 51 to 54.

Hoods 61 to 64, each of which is configured with an L-shaped angle, are mounted one by one (a total of four) at positions radially outside the air outlets 51 to 54 of the protective cover 18 so as to extend along the casing main body 22A of the reduction gear G1. In this embodiment, the hoods 61 to 64 protrude from the reduction gear connection surface 18F by an amount corresponding to an extending dimension L3. In addition, nets 51A to 54A are respectively mounted on the inner surface sides of the air outlets 51 to 54 in order to prevent the human hand from entering by mistake (refer to FIGS. 5 and 6). In addition, although not illustrated, such a net is also installed at other intakes or outlets.

On the other hand, in this embodiment, the coupling-side space P2 in which the fluid coupling F1 is included is also provided with air intakes 71 and 72 and air outlets 75 and 76 for the coupling-side space P2 in order to promote the flow of air. Specifically, the air intakes 71 and 72 are respectively provided one by one closer to the motor M1 than the fluid coupling F1 in the left side surface 18C and the right side surface 18D of the protective cover 18. The air intakes 71 and 72 have a rectangular shape (with four rounded corners) slightly wider in width than the air intakes 40 and 41 of the fan-side space P1. Further, the air outlets 75 and 76 are opened at approximately the same positions (upper and lower positions in a vertical direction: positions approximately just above and just below the fluid coupling F1) as the axial positions of the fluid coupling F1 in the upper surface 18A and the lower surface 18B of the protective cover 18. The air outlets 75 and 76 are opened at only the coupling-side space P2, and the fan-side space P1 is blocked by a top plate and a bottom plate. Specifically, the air outlets 75 and 76 have, in this embodiment, an axial opening width L5 larger than an axial width L4 of a main body portion (a portion on which the fins 30 are formed) of the fluid coupling F1 (L4<L5), as shown in FIG. 1. Further, the opening widths of the air outlets 75 and 76 in a direction perpendicular to the axis are secured to have as large a dimension as possible (by making the air outlets 75 and 76 open closer to the left and right side surfaces 18C and 18D of the protective cover 18). As a result, the air outlets 75 and 76 have a rectangular shape (with four rounded corners) having a larger opening area than the air intakes 71 and 72.

Furthermore, in the case of this embodiment, auxiliary air intakes 81 and 82 are formed closer to the partition plate 44 than the air intakes 71 and 72 of the coupling-side space P2 (in this embodiment, closer to the partition plate 44 than the fluid coupling F1) to be separately opened one by one in the left side surface 18C and the right side surface 18D of the protective cover 18. The auxiliary air intakes 81 and 82 also have a rectangular shape with four rounded corners.

Next, an operation of the power transmission device GM1 of this embodiment will be described.

The protective cover 18 of the fluid coupling F1 is provided in order to cover the fluid coupling F1 basically in terms of safety, because the casing 28 of the fluid coupling F1 rotates. This action is retained in this embodiment as well.

On the other hand, if the motor M1 rotates and the rotation of the motor M1 is transmitted to the input shaft 24 of the reduction gear G1 through the fluid coupling F1, the fan 26 mounted on the input shaft 24 rotates along with the input shaft 24 and an air flow is generated by the fan 26. The fan 26 is disposed in the fan-side space P1 (different from the coupling-side space P2 in which the fluid coupling F1 is present) due to the partition plate 44 and the air intakes 40 and 41 are formed in the fan-side space P1. For this reason, air outside the protective cover 18 is drawn from the air intakes 40 and 41 into the fan-side space P1 due to the rotation of the fan 26.

The drawn air is guided into the fan hood 27 through the through-hole 27A and the air flow holes 27B of the fan hood 27 without being affected by the coupling-side space P2 (due to the existence of the partition plate 44). In this embodiment, in particular, the partition plate 44 is disposed at the position axially separated from the axial side surface 27E of the fan hood 27 by the distance L2 secured to be greater than or equal to ⅓ of the diameter of the fan 26, and therefore, the drawn air can be efficiently taken into the fan hood 27.

The air taken into the fan hood 27 is extruded radially outward as cooling air by the blade 27C, thereafter, turned to the reduction gear G1 side along the inner peripheral surface 27D of the fan hood 27, and then discharged from the four air outlets 51 to 54 formed in the reduction gear connection surface 18F, thereby cooling the reduction gear G1. For this reason, even if the rotation direction of the input shaft 24 is changed, the cooling air of the fan 26 is always discharged toward the reduction gear G1 side from the four air outlets 51 to 54 formed in the reduction gear connection surface 18F.

Further, the fan hood 27 is mounted on the reduction gear connection surface 18F of the protective cover 18 (rather than the casing main body 22A of the reduction gear G1) and covers all of the air outlets 51 to 54, and therefore, air is not drawn from the reduction gear G1 side into the protective cover 18 through the air outlets 51 to 54. Eventually, on the side surface of the reduction gear G1, air necessarily flows from the air outlets 51 to 54 to the reduction gear load side and the flow of air is stable.

A cooling system according to this configuration is reasonable in terms of being able to particularly effectively cool the bearing housing 22B, because air moves in the vicinity of the bearing housing 22B having the highest heat load in the reduction gear G1.

On the other hand, in this embodiment, also in the coupling-side space P2, the air intakes 71 and 72 and the air outlets 75 and 76 are present, and therefore, air can pass through the coupling-side space P2, and thus it is possible to effectively dissipate heat which is generated from the fins 30 of the fluid coupling F1 to the outside of the protective cover 18. In particular, in this embodiment, the air outlets 75 and 76 are made so as to open at approximately the same axial position as (approximately just above and just below) the fluid coupling F1 in the upper surface 18A and the lower surface 18B of the protective cover 18. For this reason, it is possible to efficiently take an air flow which is generated by the fluid coupling F1 (that is, air flows which tend to converge together in the axial direction with respect to the fluid coupling F1) into the protective cover 18 and discharge the air flow to the outside of the protective cover 18 through the air intakes 71 and 72 and the air outlets 75 and 76.

Furthermore, in this embodiment, the auxiliary air intakes 81 and 82 are opened and formed close to the partition plate 44 in the coupling-side space P2. In the partition plate 44, the through-hole 44A for the passage of the input shaft 24 of the reduction gear G1 (or the output shaft of the fluid coupling F1) is formed, and therefore, it is conceivable that, if the fluid coupling F1 rotates, air is drawn from the fan-side space P1 into the coupling-side space P2 through the through-hole 44A. However, since air is drawn from the auxiliary air intakes 81 and 82 into the coupling-side space P2, draw-in of air through the through-hole 44A of the partition plate 44 is alleviated.

Due to this synergistic action, almost the whole quantity of air drawn into the fan-side space P1 through the air intakes 40 and 41 is guided to the fan 26 and utilized as cooling air which contributes to the cooling of the reduction gear G1.

In addition, with regard to the hoods 61 to 64 of the previous embodiment, of course, mounting hoods having another shape instead of the hoods or mounting other hoods in addition to the hoods 61 to 64 is freely possible and is sometimes effective as means for further increasing the effect of certain embodiments of the present invention. That is, by appropriately setting the mounting position and the shape of the hood, it is possible to more effectively lead cooling air to a site requiring further cooling.

As a modified example of the hood, for example, it is also conceivable to make the extending dimension L1 of the hood mounted in the previous embodiment longer or form a single rectangular and tubular hood (not shown) by connecting the four hoods 61 to 64. Alternatively, a configuration maybe made so as to make the protective cover (18) itself have the function of a hood by extending the upper and lower surfaces 18A and 18B and the left and right side surfaces 18C and 18D of the protective cover 18 itself further to the reduction gear G1 side than the reduction gear connection surface 18F. Of course, a hood may be attached to the air intake or the air outlet of the coupling-side space.

Further, in certain embodiments of the present invention, in both the fan-side space P1 and the coupling-side space P2, the specific formation positions, the opening sizes, the number, the shapes, and the like of the air intakes 40, 41, 71, and 72 or the air outlets 51-54, 75, and 76 are not limited to the example of the above-described embodiment. In fact, the specific formation positions, the opening sizes, the number, the shapes, and the like of the air intakes or the air outlets may be appropriately set according to differential pressure (a difference in pressure of air) or the flow of air actually occurring in the protective cover. With respect to the auxiliary air intake, if there is almost no air which is drawn in from the partition plate (the guide unit), formation itself may be omitted.

Further, in the embodiment described above, as a specific configuration of the guide unit, a configuration in which a partition plate having a simple configuration is disposed is adopted. However, in certain embodiments of the present invention, the configuration of the guide unit also need not necessarily be a configuration using a partition plate and, for example, a configuration is also acceptable in which a so-called "duct" of a bellows type is directly introduced from the air intake for the fan into the through-hole or the air flow hole of the fan hood.

Next, a power transmission device according to an example of another embodiment of the present invention will be described using FIGS. 7 to 9.

The previous embodiment and this embodiment are the same in terms of measures based on the knowledge that "the fluid coupling rotates, whereby the fluid coupling itself generates its own air flow, and this air flow and an air flow of the fan mounted on the reduction gear interfere with each other in the protective cover". However, in the previous embodiment, with respect to an air flow which the fluid coupling itself uniquely generates due to the rotation of the fluid coupling, a devisal has been made such that the air flow and an air flow of the cooling fan mounted on the reduction gear do not interfere with each other. However, in this embodiment, a configuration is made such that an air flow which the fluid coupling itself generates is actively utilized for the cooling of the reduction gear. For this reason, although there are also portions slightly overlapping those in the previous embodiment, in order to avoid confusion, description will be made generally.

Figure 7:
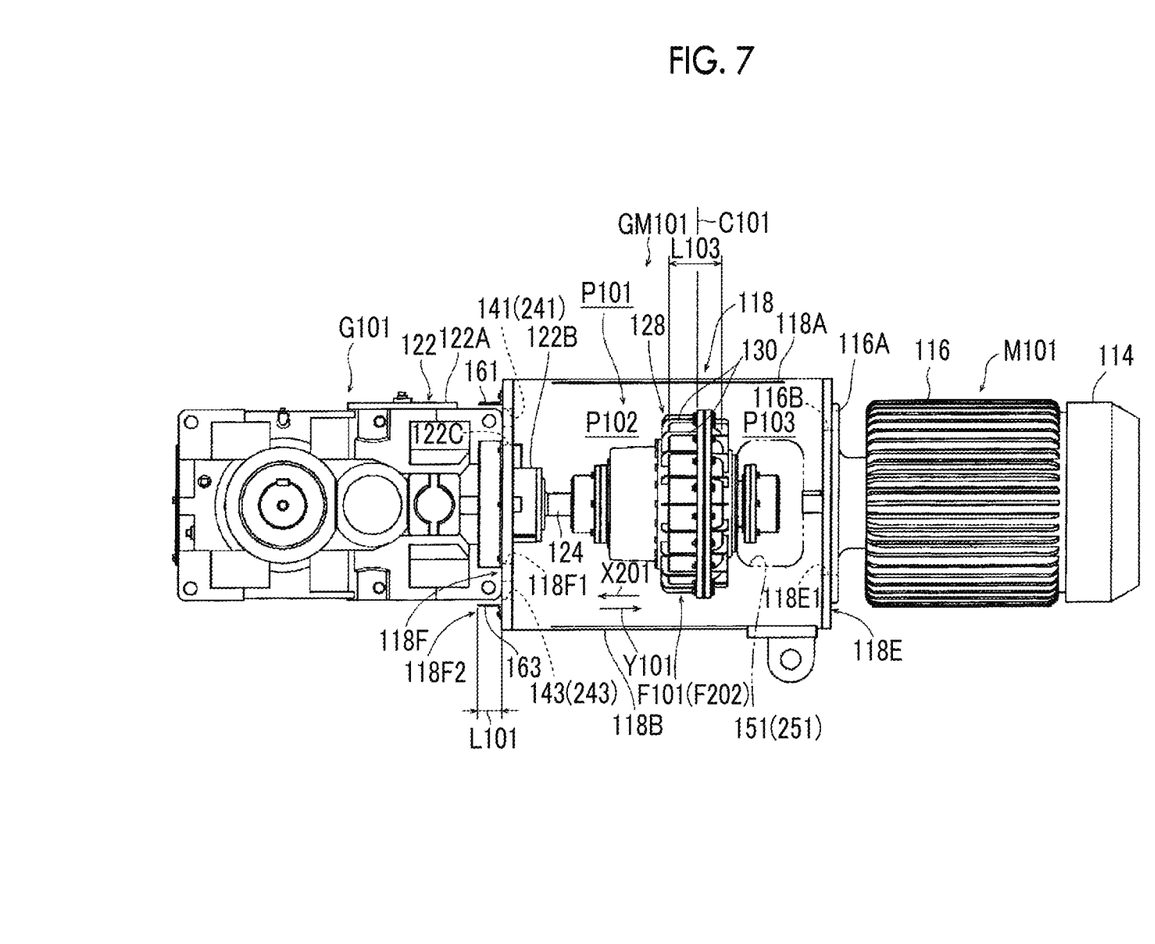
FIG. 7 is a front view showing the entirety of a power transmission device according to an example of an embodiment of the present invention.

FIG. 7 is a front view showing the entirety of a power transmission device according to an example of another embodiment. In FIG. 7, the side surface (the front in FIG. 7) of a protective cover is removed, and thus a state in the protective cover is made so as to be visible.

In a power transmission device GM101 according to this embodiment, a motor M101 and a reduction gear G101 are connected through a fluid coupling F101.

The motor M101 is a three-phase induction motor. A cooling fan (not shown) is provided on the side opposite to the load side of the motor M101. The cooling fan is covered with a fan cover 114. A spigot joint portion 116B which is joined to a protective cover 118 is formed at a case cover 116A on the load side of a casing 116 of the motor M101.

As the reduction gear G101, a three-stage type orthogonal reduction gear is adopted. However, similar to the previous embodiment, also in this embodiment, the number of stages of the reduction gear is not particularly limited and, for example, a two-stage type or four-stage type reduction gear is also acceptable. Further, a reduction mechanism is also not particularly limited and, for example, a parallel shaft reduction mechanism or a planetary gear reduction mechanism is also acceptable.

A casing 122 of the reduction gear G101 is configured to mainly include a casing main body 122A and a bearing housing 122B formed to protrude from the casing main body 122A to the motor side. A bearing (not shown) which rotatably supports an input shaft 124 of the reduction gear G101 is accommodated in the bearing housing 122B. In addition, a cooling fan is not mounted on the input shaft 124 of the reduction gear G101 of the power transmission device GM101.

As described above, the motor M101 and the reduction gear G101 are connected through the fluid coupling F101. However, foreign matter is sometimes bitten by the fluid coupling F101 according to the use of the power transmission device GM101 of this embodiment. There is a concern that the coupling rigidly connecting the motor side and the reduction gear side may stop the entire device when such foreign matter is bitten, and there is a worry of occurrence of overload. The fluid coupling F101 is a coupling in which there is an advantage such as relaxing a shock at the time of start-up or the time of sudden stop, in addition to avoidance of the overload when such foreign matter is bitten.

The fluid coupling F101 itself is known, and the fluid coupling F101 has a configuration in which a pump impeller (an input-side vane wheel) and a runner (an output-side vane wheel), none of which is shown, face each other in a casing 128 filled with oil and the rotation of the pump impeller on the input side makes the oil flow, thereby rotating the runner on the output side. In addition, the fluid coupling in certain embodiments of the present invention includes the concept of a torque converter provided with a stator, in addition to a so-called narrowly-defined fluid coupling. These points are also the same as in the previous embodiment.

A large number of fins 130 are provided at the outer periphery of the casing 128 of the fluid coupling F101. This is intended to dissipate heat generated in the fluid coupling F101 itself to the outside of the casing 128 of the fluid coupling F101. However, the fins 130 are rotated, thereby generating an air flow. More specifically, in the fluid coupling F101 according to this embodiment, an air flow Y101 from the reduction gear side to the motor side is generated from conditions such as the shape, the mounting direction, and the rotation direction of the fins 130 of the casing 128.

In this embodiment, the "air flow Y101 which is generated toward the motor side from the reduction gear side" is actively utilized for the cooling of the reduction gear G101 by making the protective cover 118 covering the fluid coupling F101 in terms of safety function as, so to speak, a "duct".

Hereinafter, the configuration of a cooling system of the reduction gear G101 utilizing the protective cover 118 will be described.

Figure 8:
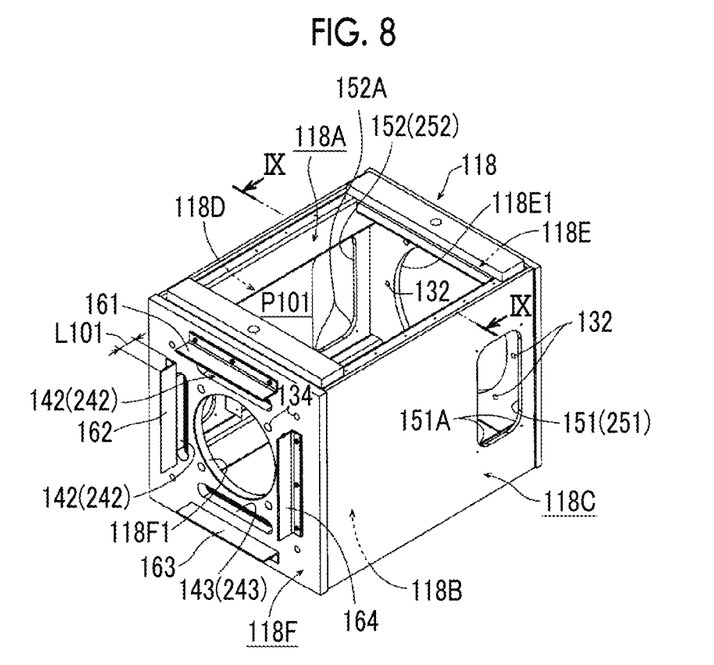
FIG. 8 is a perspective view of a protective cover of the power transmission device.
Figure 9:
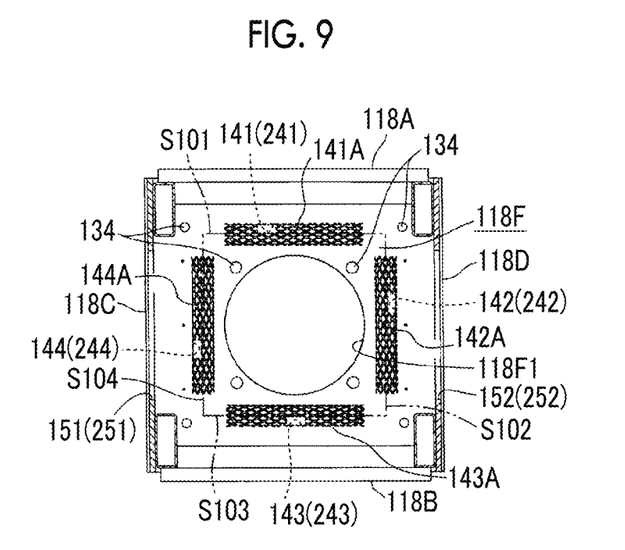
FIG. 9 is a cross-sectional view showing the inner surface on the reduction gear side of the protective cover, as taken along line IX-IX of FIG. 8 and viewed from a direction of an arrow.

FIG. 8 is a perspective view (shown with an upper surface removed) of the protective cover 118 of the power transmission device GM101, and FIG. 9 is a cross-sectional view showing the inner surface on the reduction gear side of the protective cover 118, as taken along line IX-IX of FIG. 8 and viewed from a direction of an arrow.

The protective cover 118 is formed into the form of a substantially rectangular parallelepiped-shaped box. For convenience, with respect to the respective surfaces of the rectangular parallelepiped, surfaces horizontally extending at an upper portion and a lower portion of the protective cover 118 will be referred to as an upper surface 118A and a lower surface 118B, surfaces provided to be vertically erect so as to connect the upper surface 118A and the lower surface 118B will be referred to as a left side surface 118C and a right side surface 118D (based on a direction when the reduction gear G101 is viewed from the motor M101 side), a surface (perpendicular to an axis and facing the motor M101) which is fixed to the casing 116 of the motor M101 will be referred to as a motor connection surface 118E, and a surface (perpendicular to the axis and facing the reduction gear G101) which is fixed to the casing 122 of the reduction gear G101 will be referred to as a reduction gear connection surface 118F. In addition, in FIG. 8, a top plate of the upper surface 118A of the protective cover 118 is illustrated as being opened to a large extent such that the inside of the protective cover 118 is seen. In fact, the upper surface 118A and the lower surface 118B of the protective cover 118 are blocked by the top plate and a bottom plate, and an opening is not formed therein.

A through-hole 118E1 which is engaged with the spigot joint portion 116B of the casing 116 of the motor M101 is formed in the motor connection surface 118E of the protective cover 118. The motor connection surface 118E and the motor M101 are connected by bolts (only bolt holes are shown) 132 after each other's axial centers are matched through the spigot joint portion 116B and the through-hole 118E1.

Further, a through-hole 118F1 which is engaged with a spigot joint portion 122C of the casing 122 of the reduction gear G101 is formed in the reduction gear connection surface 118F of the protective cover 118. The reduction gear connection surface 118F and the reduction gear G101 are connected by the casing main body 122A of the reduction gear G101 and bolts (only bolt holes are shown) 134 at the outer periphery of the bearing housing 122B after each other's axial centers are matched through the spigot joint portion 122C and the through-hole 118F1. That is, the bearing housing 122B faces the inside of the protective cover 118 with a portion thereof going beyond the reduction gear connection surface 118F of the protective cover 118.

Due to the existence of the protective cover 118, a space P101 between the casing 116 of the motor M101 and the casing 122 of the reduction gear G101 becomes an almost closed space in which the fluid coupling F101 is accommodated. The fluid coupling F101 is located slightly closer to the motor than the center in the axial direction of the protective cover 118, and a space P102 closer to the reduction gear than the fluid coupling F101 is secured to be wider than a space P103 close to the motor.

The reduction gear connection surface 118F of the protective cover 118 has an enlarged portion 118F2 larger in the radial direction than the outer shape of the casing 122 of the reduction gear G101. In this embodiment, in a space (specifically, at a position corresponding to the outer periphery of the bearing housing 122B of the casing 122 of the reduction gear G101) of the enlarged portion 118F2, four linearly elongated air intakes 141 to 144 are provided along sides S101 to S104 of an imaginary square. The enlarged portion 118F2 is equivalent to a "position close to the reduction gear" of the protective cover 118.

In addition, an outer peripheral position of the bearing housing 122B of the casing 122 of the reduction gear G101 (positions corresponding to the air intakes 141 to 144 formed in the reduction gear connection surface 118F) has a shape (having a small radial dimension) slightly recessed in the radial direction further than the external surface of the major portion of the casing main body 122A of the reduction gear G101. Therefore, the casing main body 122A of the reduction gear G101 does not block the air intakes 141 to 144.

Hoods 161 to 164, each of which is configured by an L-shaped angle, are mounted one by one (a total of four) at the positions radially outside the air intakes 141 to 144 of the protective cover 118 so as to extend along the casing main body 122A of the reduction gear G101. In this embodiment, the hoods 161 to 164 protrude from the reduction gear connection surface 118F by an amount corresponding to an extending dimension L101. In addition, nets 141A to 144A are respectively mounted on the inner surface sides of the air intakes 141 to 144 in order to prevent the human hand from entering by mistake (refer to FIG. 9). In addition, although illustration is not made, such a net is also installed at other intakes or outlets.

Further, air outlets 151 and 152 are provided at "positions away from the reduction gear G101" of the left side surface 118C and the right side surface 118D of the protective cover 118, more specifically, positions further away from the reduction gear G101 than the air intakes 141 to 144. Specifically, the air outlets 151 and 152 have rectangular shapes in which corner portions 151A and 152A are rounded, and are respectively opened longitudinally long one by one at the positions further toward the motor side than the fluid coupling F101 of the left side surface 118C and the right side surface 118D. In addition, here, the "position further toward the motor M101 side than the fluid coupling F101" means that more than half of the air outlet (in an embodiment which will be described later, an air intake) is opened further to the motor M101 side than a center C101 in the axial direction of a formation range L103 of the fins 130 of the fluid coupling F101. Incidentally, in this embodiment, the entirety of each of the air outlets 151 and 152 is opened further to the motor side than the center C101 in the axial direction of the formation range L103 of the fins 130 of the fluid coupling F101.

Next, an operation of the power transmission device GM101 of this embodiment will be described.

The protective cover 118 of the fluid coupling F101 is provided in order to cover the fluid coupling F101 basically in terms of safety, because the casing 128 of the fluid coupling F101 rotates. This action is retained in this embodiment as well.

On the other hand, the protective cover 118 forms the space P101 being between the casing 116 of the motor M101 and the casing 122 of the reduction gear G101 and is nearly hermetically closed (at portions other than the opening portions of the air intakes 141 to 144 and the air outlets 151 and 152) in a state of accommodating the fluid coupling F101. As described above, in this embodiment, an air flow X101 moving from the reduction gear side to the motor side is generated by the fluid coupling F101.

For this reason, if the fluid coupling F101 rotates in the space P101 nearly hermetically closed, since air pressure in the space P102 close to the reduction gear of the fluid coupling F101 is lowered due to the movement of air, air outside the protective cover 118 is drawn from the four air intakes 141 to 144 (disposed at a position close to the reduction gear) formed in the reduction gear connection surface 118F into the protective cover 118.

Further, since air pressure in the space P103 close to the motor of the fluid coupling F101 is increased, the drawn air is discharged from the air outlets 151 and 152 (disposed at a position away from the reduction gear) to the outside of the protective cover 118. That is, the protective cover 118 functions as a "duct" for moving and discharging air drawn from the air intakes 141 to 144 from the reduction gear side to the motor side in the protective cover 118.

In particular, in this embodiment, since the air outlets 151 and 152 (being at a position away from the reduction gear G101) are opened further to the motor M101 than the fluid coupling F101 (that is, since the air intakes 141 to 144 and the air outlets 151 and 152 are disposed with the fluid coupling F101 interposed therebetween), it is possible to efficiently move air in the protective cover 118 by maximally using the air flow X101 which is generated by the rotation of the fluid coupling F101.

In this way, air around the casing main body 122A of the reduction gear G101 is drawn into the air intakes 141 to 144 and then continuously moves. In this way, new air converges around the casing main body 122A of the reduction gear G101 at all times, and therefore, the converging air cools the casing main body 122A. Further, the cooling of the fluid coupling F101 itself is also performed at the same time in the protective cover 118.

Further, the bearing housing 122B (requiring cooling) having the highest heat load in the reduction gear G101 always touches the converging air and air drawn into the cover, and therefore, it is possible to very efficiently perform the cooling of the bearing housing 122B.

As a result, a cooling fan (for the reduction gear G101) which has been regarded as being essential in this type of use in the past becomes unnecessary, and thus significant cost reduction can be attained.

Incidentally, as described above, the direction (orientation) of an air flow which is generated by the rotation of the fluid coupling F101 depends on the shapes of the fins 130 of the fluid coupling F101, the mounting direction of the fluid coupling F101, the rotation direction of the fluid coupling F101, or the like. Conversely speaking, in the case of a "fluid coupling F202" (shown in parentheses in FIG. 7) in which a condition such as the shapes of the fins, the mounting direction, or the rotation direction is changed, contrary to the previous embodiment, an air flow X201 from the motor side to the reduction gear side is generated.

If the air flow X201 from the motor side to the reduction gear side is generated by the rotation of the fluid coupling F202, for example, even in a cooling system configuration identical to that in the above-described embodiment, the four air intakes 141 to 144 (disposed at a position close to the reduction gear) formed in the reduction gear connection surface 118F in the above-described embodiment automatically function as air outlets 241 to 244. Further, the two air outlets 151 and 152 (disposed at a position away from the reduction gear) formed in the left side surface 118C and the right side surface 118D in the above-described embodiment automatically function as air intakes 251 and 252.

More specifically, when the direction of the air flow is X201, air in the vicinity of the left and right side surfaces 118C and 118D of the protective cover 118 is drawn from the air intakes 251 and 252 (disposed at a position away from the reduction gear G101, more specifically, disposed at a position further away from the reduction gear G101 than the air outlets 241 to 244) into the protective cover 118, moves toward the reduction gear side in the protective cover 118, and is discharged from the air outlets 241 to 244 (disposed at a position close to the reduction gear) disposed at the reduction gear connection surface 118F of the protective cover 118, whereby the casing 122 of the reduction gear G101 is cooled.

Also in this case, the bearing housing 122B having the highest heat load is strongly cooled by air in the protective cover 118 or air immediately after being discharged from the air outlets 241 to 244 of the reduction gear connection surface 118F, and therefore, it is possible to dissipate heat well. Further, the cooling of the fluid coupling F202 itself is also performed at the same time.

In addition, of course, mounting hoods having another shape instead of the hoods 161 to 164 in the previous embodiment or mounting other hoods in addition to the hoods 161 to 164 is freely possible and is sometimes very effective as means for further increasing the effect of certain embodiments of the present invention. That is, by appropriately setting the mounting position and the shape of the hood, it is possible to lead more effectively converging (or discharged) air to a site requiring further cooling.

As a modified example of the hood, for example, it is also conceivable to make the extending dimension L101 of the hood mounted in the previous embodiment longer or form a single rectangular and tubular hood (not shown) by connecting the four hoods 161 to 164. Alternatively, a configuration may be made so as to make the protective cover (118) itself have the function of a hood by extending the upper and lower surfaces 118A and 118B and the left and right side surfaces 118C and 118D of the protective cover 118 itself further to the reduction gear side than the reduction gear connection surface 118F. Of course, a hood may be attached to the vicinity of the air outlets 151 and 152 (the air intakes 251 and 252) of the left and right side surfaces 118C and 118D.

In addition, in the above-described embodiment shown in FIGS. 7 to 9, the mounting of a cooling fan of the reduction gear G101 is omitted. However, also in the embodiment shown in FIGS. 7 to 9, the mounting of the cooling fan of the reduction gear is not prohibited and may be used along with the fluid coupling with an appropriately designed fan cover or hood.

Further, in the above-described embodiment shown in FIGS. 7 to 9, the air intakes (or the air outlets) which are disposed at a position closer to the reduction gear than the fluid coupling are opened at the enlarged portion (where the outer shape of the protective cover is formed to be larger in the radial direction than the outer shape of the casing of the reduction gear) and the shape of the hood is simplified. However, of course, certain embodiments of the present invention was not originally intended to require the formation of the air intakes (or the air outlets) close to the reduction gear at this position, and for example, the air intakes (or the air outlets) may also be formed in the left and right side surfaces or the upper and lower surfaces (in this case, it is preferable to attach a larger hood). Also with regard to the air outlets (or the air intakes) which are disposed at a position away from the reduction gear, similarly, the opening position is not limited to this example. That is, the opening position need not necessarily be closer to the motor than the fluid coupling and may be disposed, for example, at approximately the same axial position as the fluid coupling. Further, the air outlets (or the air intakes) need not be necessarily disposed in the side surfaces and may be disposed in the upper surface or the lower surface. Further, the shape itself of the protective cover also need not necessarily be a rectangular parallelepiped shape and may be, for example, a cylindrical shape.

In short, both the air intake and the air outlet may be formed at appropriate positions according to the shape of the protective cover and the shape of the casing of the reduction gear or the position of a portion having high heat load, and not only the formation position, but also the opening shape, the number, and the like are not limited to the above-described example.

Certain embodiments of present invention are applicable to a power transmission device in which a motor and a reduction gear are connected through a fluid coupling.

It should be understood that the invention is not limited to the above-described embodiment, but may be modified into various forms on the basis of the spirit of the invention. Additionally, the modifications are included in the scope of the invention.

What is claimed is:

1. A power transmission device in which a motor and a reduction gear are connected through a fluid coupling, comprising:

a fan for reduction gear cooling provided at an input shaft of the reduction gear;

a fan hood configured to cover the fan; and a protective cover configured to cover the fluid coupling, wherein the protective cover includes a partition plate configured to partition a fan-side space which includes the fan from a coupling-side space which includes the fluid coupling, and a first air intake which opens to the fan-side space, wherein the partition plate is disposed at a position separated in an axial direction from the fan hood and includes a through-hole for the passage of an input shaft of the reduction gear or an output shaft of the fluid coupling, wherein the protective cover is provided with a second air intake and an air outlet which open to the coupling-side space, and wherein the protective cover is provided with a third air intake which opens to the coupling-side space at a position closer to the partition plate than the second air intake.

2. The power transmission device according to claim 1, wherein the partition plate is disposed at a position separated in an axial direction from the fan hood by a distance greater than or equal to ⅓ of a diameter of the fan.

3. The power transmission device according to claim 1, wherein the air outlet opens at a vertical position in a vertical direction of the protective cover.

4. The power transmission device according to claim 1, wherein the partition plate is provided from a vicinity of an upper surface to a vicinity of a lower surface of the protective cover.

5. The power transmission device according to claim 1, wherein the protective cover includes a reduction gear connection surface which faces the reduction gear and is perpendicular to the input shaft, and the reduction gear connection surface has an enlarged portion larger in a radial direction than an outer shape of a casing of the reduction gear, and an air outlet which opens to the enlarged portion.

6. A power transmission device in which a motor and a reduction gear are connected through a fluid coupling, comprising:
- a protective cover configured to cover the fluid coupling,
- wherein an air intake is disposed at a position close to the reduction gear of the protective cover,
- an air outlet is disposed at a position away from the reduction gear of the protective cover,
- air drawn in from the air intake by rotation of the fluid coupling is discharged from the air outlet,
- the protective cover includes a reduction gear connection surface which faces the reduction gear and is perpendicular to an input shaft of the reduction gear,
- the reduction gear connection surface has an enlarged portion larger in a radial direction than an outer shape of a casing of the reduction gear,
- the air intake opens to the enlarged portion,
- the power transmission device further includes a bearing housing configured to accommodate a bearing which supports the input shaft, and
- a part of the bearing housing is disposed in the protective cover.

7. The power transmission device according to claim 6, wherein the reduction gear has no cooling fan.

8. The power transmission device according to claim 6, wherein the protective cover has, at a surface facing the reduction gear, an enlarged portion larger in a radial direction than an outer shape of a casing of the reduction gear, and an air intake or an air outlet close to the reduction gear is opened at the enlarged portion of the protective cover.

9. The power transmission device according to claim 6, further comprising:
- a hood extending along a casing of the reduction gear from the air intake or the air outlet.

10. The power transmission device according to claim 6, wherein the air outlet or the air intake at a position away from the reduction gear is located further to the motor side than the fluid coupling.

11. A power transmission device in which a motor and a reduction gear are connected through a fluid coupling, comprising:
- a protective cover configured to cover the fluid coupling,
- wherein an air intake is disposed at a position close to the reduction gear of the protective cover,
- an air outlet is disposed at a position away from the reduction gear of the protective cover,
- air drawn in from the air intake by rotation of the fluid coupling is discharged from the air outlet,
- the protective cover includes a reduction gear connection surface which faces the reduction gear and is perpendicular to an input shaft of the reduction gear,
- the reduction gear connection surface has an enlarged portion larger in a radial direction than an outer shape of a casing of the reduction gear,
- the air intake opens to the enlarged portion,
- the protective cover is formed into the shape of a rectangular parallelepiped-shaped box, and
- the fluid coupling is located closer to the motor than a center in the axial direction of the protective cover, and in the protective cover, a space closer to the reduction gear than the fluid coupling is wider than a space closer to the motor than the fluid coupling.

* * * * *